United States Patent [19]

Ito et al.

[11] Patent Number: 4,949,078
[45] Date of Patent: Aug. 14, 1990

[54] FAIL-SAFE OPERATION OF A VEHICLE AUTOMATIC TRANSMISSION RESPONSIVE TO FAILURE OF ENGINE WATER TEMPERATURE SENSOR

[75] Inventors: Yasunobu Ito; Kenji Suzuki; Kazuhiro Mikami, all of Aichi, Japan

[73] Assignee: Aisin AW Kabushiki Kaisha, Japan

[21] Appl. No.: 282,275

[22] Filed: Dec. 9, 1988

[30] Foreign Application Priority Data

Dec. 28, 1987 [JP]  Japan .................................. 62-329511

[51] Int. Cl.⁵ ............................................. G08B 21/00
[52] U.S. Cl. ..................................... 340/635; 340/449;
340/438; 364/424.1; 364/424.03; 73/118.1
[58] Field of Search ....................... 340/449, 438, 635;
123/198 D; 364/424.1, 424.01, 424.03, 424.05;
374/144, 145; 73/117.2, 118.1

[56] References Cited

U.S. PATENT DOCUMENTS

| | | | |
|---|---|---|---|
| 3,821,562 | 6/1974 | Davis et al. | 374/144 |
| 4,069,712 | 1/1978 | Armstrong et al. | 374/145 |
| 4,208,929 | 6/1980 | Heino | 74/731 |
| 4,488,140 | 12/1984 | Lang et al. | 340/449 |
| 4,566,354 | 1/1986 | Kumura et al. | 364/424.1 |
| 4,635,034 | 1/1987 | Tokuyama et al. | 340/441 |
| 4,695,822 | 9/1987 | Furukawa | 340/449 |
| 4,752,883 | 6/1988 | Asakura et al. | 340/441 |

Primary Examiner—Joseph A. Orsino
Assistant Examiner—Jill Jackson
Attorney, Agent, or Firm—Lorusso & Loud

[57] ABSTRACT

A fail-safe control device for an electronically controlled automatic transmission to be mounted on a vehicle arranged in such a manner that the number of engine revolution or the number of revolution input to a T/M is detected, the duration of the engine revolving state is counted, and it is determined that a failure of the engine water temperature sensor occurs if the engine water temperature detected by the engine water temperature sensor after a predetermined time elapse counted is lower than a predetermined temperature. As a result of this, a proper fail-safe control against the failure of the engine water temperature sensor can be performed.

7 Claims, 3 Drawing Sheets

FAIL-SAFE OPERATION OF A VEHICLE AUTOMATIC TRANSMISSION RESPONSIVE TO FAILURE OF ENGINE WATER TEMPERATURE SENSOR

BACKGROUND OF THE INVENTION

The present invention relates to a fail-safe control for an electronically controlled automatic transmission to be mounted on a vehicle, and, more particularly, to a fail-safe control against a failure of an engine water temperature sensor for an electronically controlled automatic transmission.

In the conventional electronically controlled automatic transmissions, the gear ratio of a T/M (transmission) and whether the lock-up clutch is turned on or off are determined in response to signals representing the degree of opening of a throttle and car speed so that an actuator such as a solenoid mounted on the T/M is controlled.

Furthermore, in order to improve driveability and engine protection, operation at the maximum gear ratio and the operation of a lock-up clutch are prohibited if the engine water temperature is determined to be too low in accordance with a signal representing the engine water temperature.

However, in the conventional method, if a engine water temperature sensor fails, the maximum gear ratio and the lock-up clutch cannot be operated although the engine temperature has been brought to a sufficiently high level, with the result that the fuel consumption becomes worse and noises are generated.

SUMMARY OF THE INVENTION

An object of the present invention is to provide a fail-safe control device for an electronically controlled automatic transmission and a fail-safe control method for the same capable of reliably detecting when the engine water temperature has become sufficiently high, and thereby operating the maximum gear ratio and a lock-up clutch so that a reliable fail-safe control is achieved.

In order to achieve the above-described object, the present invention provides means for detecting the number of engine revolutions or the number of revolutions input to a T/M; time counting means for measuring duration of engine revolution; and an engine water temperature sensor. If the engine water temperature detected by the engine water temperature sensor is below a predetermined temperature after a certain time period counted by the counting means, a failure of the engine water temperature sensor is signaled.

Furthermore, the present invention provides a fail-safe control method for an electronically controlled automatic transmission comprising: detecting the number of engine revolutions or the number of revolutions input to a T/M; counting the duration of engine revolution; and determining if the engine water temperature detected by the engine water temperature sensor is below a predetermined level after a predetermined time period counted, determining a failure of the engine water temperature sensor.

According to the present invention, an occasion when the engine water temperature sensor (or a switch) indicates a low level (in a case of a water temperature switch, it is turned on or off, while in a case of a linear water temperature sensor, it is below a predetermined level), after engine revolution has continued for a predetermined duration, can be detected and treated as a failure of the engine water temperature sensor. Furthermore, a fail-safe control can be performed.

This fail-safe control, when the engine water temperature is indicated to be at a high level, allows shift to the maximum gear ratio and operation of the lock-up clutch. If it is determined that a failure occurs, such failure state can be stored in an electronic control device so that the serviceability can be improved. Furthermore, a driver may be notified of the failure by a failure alarm device.

Furthermore, the present invention can replace an engine water temperature sensor when the same cannot be mounted due to some structural reason or the same is intended to be omitted for cost reduction.

DESCRIPTION OF THE PREFERRED EMBODIMENT

An embodiment of the present invention will now be in detail described with reference to the drawings.

Figure 1:
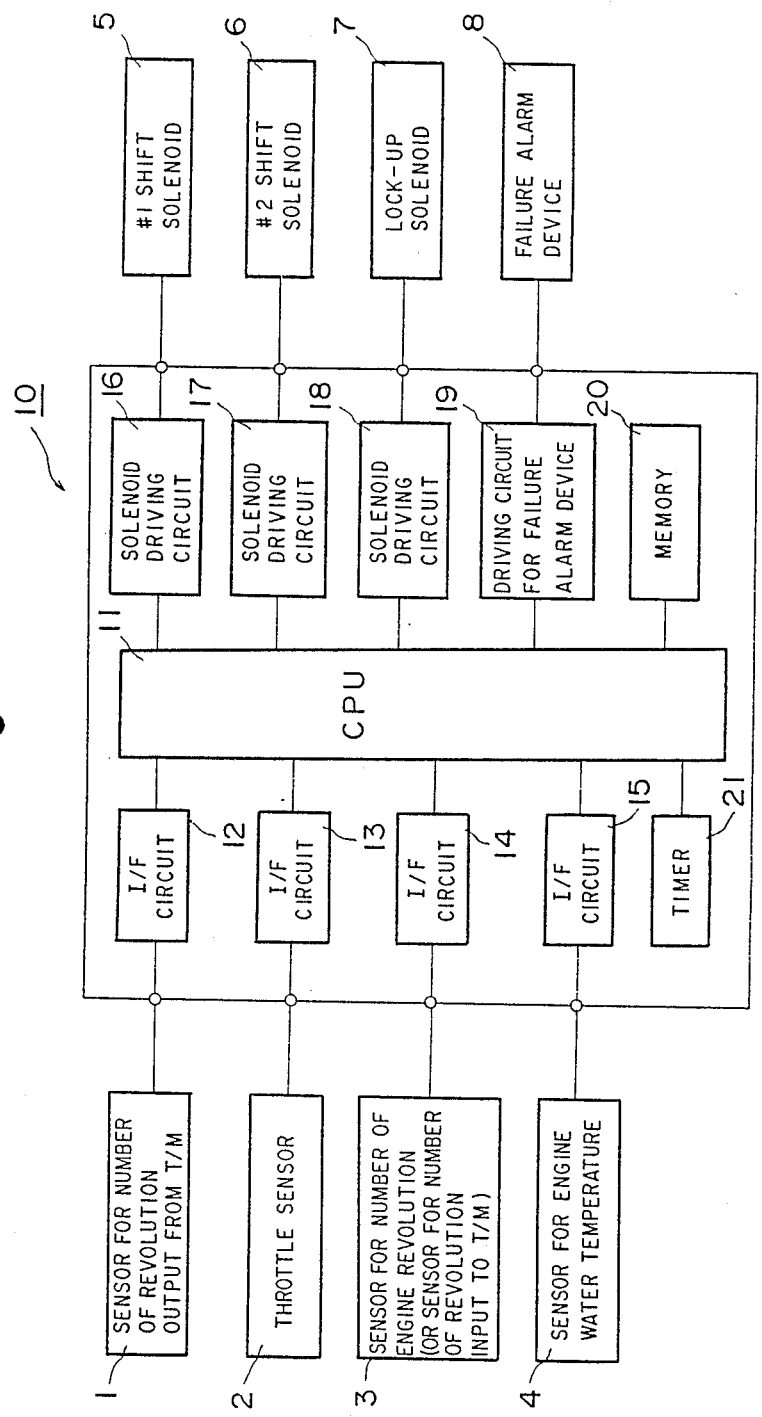
FIG. 1 is an overall structural view of a fail-safe control system for an electronically controlled automatic transmission according to an embodiment of the present invention.

FIG. 1 is an overall structural view of a fail-safe control system for an electronically controlled automatic transmission according to an embodiment of the present invention.

Referring to this drawing, reference numeral 1 represents a sensor for the number of revolutions output from a T/M, 2 represents a throttle sensor, 3 represents a sensor for the number of engine revolutions or sensor for the number of revolutions input to the T/M which is the number of revolutions of a $C_1$ drum of an FF vehicle, 4 represents a sensor for engine water temperature, 5 represents a first shift solenoid, 6 represents a second shift solenoid, 7 represents a solenoid for controlling lock-up (called a "lock-up solenoid" hereinafter), 8 represents a failure alarm device, 10 represents an electronic control device, 11 represents a central processing unit (CPU), 12 to 15 each represents an interface circuit, 16 represents a driving circuit for the first shift solenoid 5, 17 represents a driving circuit for the second shift solenoid 6, 18 represents a driving circuit for the lock-up solenoid 7, 19 represents a driving circuit for the failure alarm device, 20 represents a memory, and 21 represents a timer.

Figure 2:
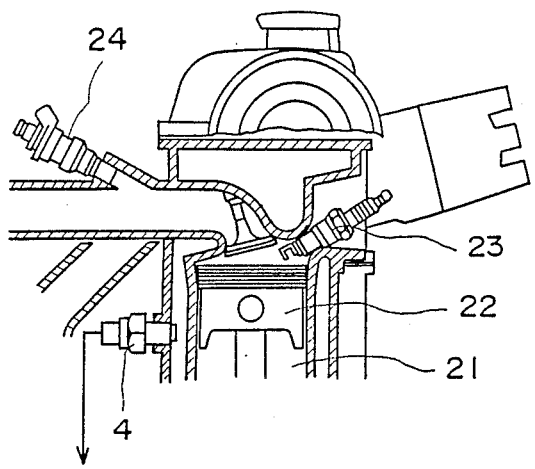
FIG. 2 is a partial cutaway view of an engine on which an engine water temperature sensor is mounted according to the present invention.

FIG. 2 is a partial cutaway view of an engine in which the engine water temperature sensor 4 is provided. Referring to this drawing, reference numeral 21 represents a cylinder, 22 represents a piston, 23 represents an ignition cap, and 24 represents an injector.

Figure 3:
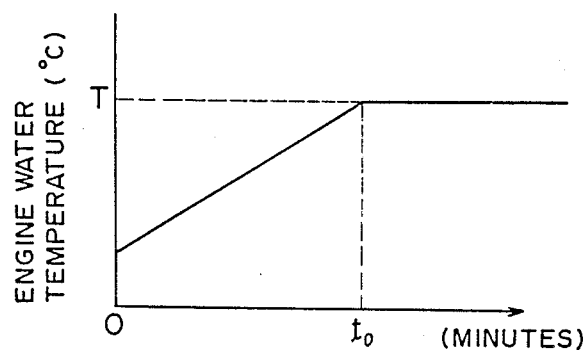
FIG. 3 is an illustration of the relationship between engine operating time and engine water temperatures, showing time $t_o$ according to the present invention.

When the revolution of the engine is sustained, the water temperature in the engine rises, for example, as shown in FIG. 3. That is, the engine temperature becomes T°C. at $t_o$ minutes. If the engine temperature sensor is normal, the water temperature sensor indicates a value exceeding a predetermined level so that the electronic control device allows a shift to the maximum gear ratio and operation of the lock-up clutch. Therefore, the control requires a set constant time as a criterion upon which to base a failure determination, i.e. a time equal to a margin α added to $t_o$. Since this constant time differs depending upon the type of engine, it needs to be predetermined experimentally and stored in the memory 20.

Figure 4:
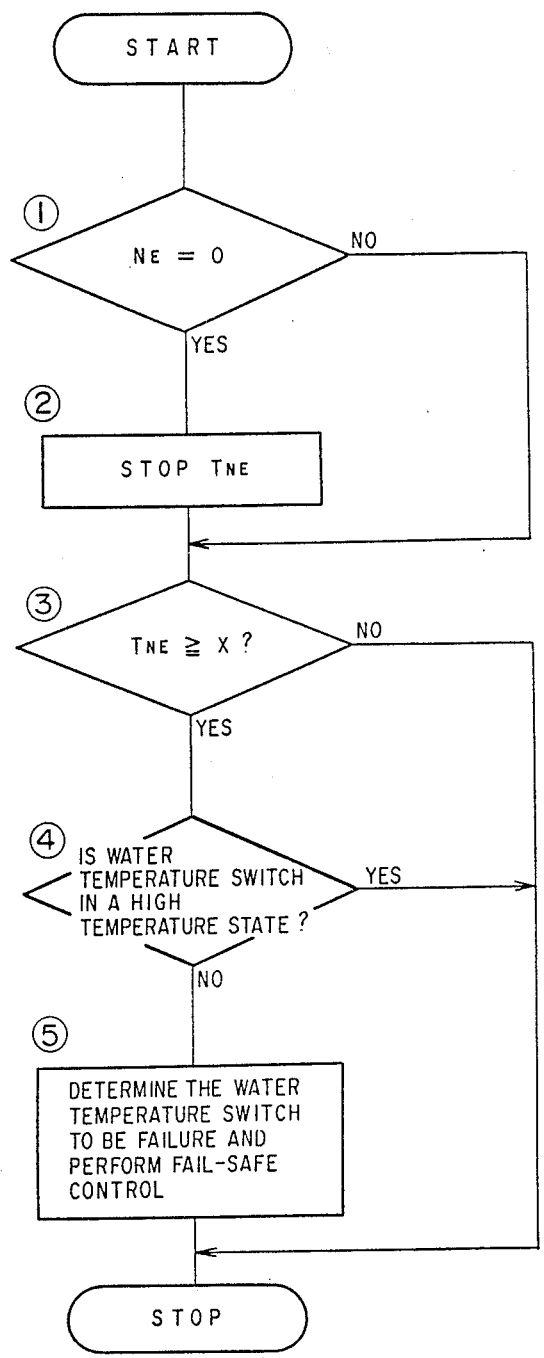
FIG. 4 is a flow chart illustrating operation of a fail-safe control system for an electronically controlled automatic transmission according to the present invention.

An operation of a fail-safe control system for this electronically controlled automatic transmission will be in detail described with reference to FIG. 4.

First, it is determined whether the engine is revolved or not (step ①).

Then, when the engine is not revolved, the accumulation of time counted by the timer 21 which has been counted when the engine has been revolving is stopped, and this accumulated time is retained (step ②).

Next, it is determined whether time $T_{NE}$ counted by the timer 21 has reached a predetermined time x or not (step ③).

Then, if the counted time has reached the predetermined time x, it is determined whether the water temperature state is in a high temperature state or not (step ④). The existence of a high temperature state may be determined by either the turned off type or the turned on type switch, with the only requirement being that it needs to be a water temperature switch. If it is a linear water temperature sensor, it must indicate a level above a predetermined level.

If the temperature indicated by the water temperature switch is not the high temperature state, it is determined that the water temperature switch is in a failure state so that a flag, prohibiting lockup and gear shift to the maximum gear ratio, this prohibition being performed when the indicated engine water temperature is low, and this flag standing when the water temperature switch is normal, is cleared. Thus, a flag representing a failure of an engine water temperature sensor is set so as to perform a fail-safe control (step ⑤).

The present invention is not limited to the above-described embodiment; other various modifications based on the spirit of the present invention are possible and they are not excluded from the scope of the present invention.

What we claim is:

1. A fail-safe control device for an electronically controlled automatic transmission having a lock-up clutch comprising:

(a) means for detecting the number ($N_E$) of engine revolutions or revolutions input to the transmission;
    (b) time counting means for measuring duration of engine operation after said number exceeds zero and generating a signal representative of counted time;
    (c) an engine water temperature sensor; and
    (d) means for receiving said signal and for determining that said engine water temperature sensor is in a failure state when the engine water temperature detected by said engine water temperature sensor, after said counted time exceeds a predetermined time, is lower than a temperature predetermined for said counted time.

2. A fail-safe control device for an electronically controlled automatic transmission according to claim 1, wherein said failure of said engine water temperature sensor is displayed by operation of a failure alarm device.

3. The fail-safe control device of claim 1 further comprising:

means for preventing operation of the lock-up clutch of the transmission and for preventing shifting to the maximum gear ratio of the transmission responsive to determination of the failure state of said engine water temperature sensor.

4. The fail-safe control device of claim 1 further comprising a failure alarm for notifying the driver of a failure of said engine water temperature sensor responsive to a determination of the failure state.

5. A fail-safe control method for an electronically controlled automatic transmission having a lock-up clutch, provided in a vehicle equipped with an engine water temperature sensor, said method comprising:

(a) detecting the number ($N_E$) of engine revolutions or revolutions input to the transmission;
    (b) begin counting elapsed time when said number exceeds zero to obtain a counted elapsed time; and
    (c) determining that said engine water temperature sensor is in a failure state if the engine water temperature detected by the engine water temperature sensor, after a predetermined elapsed time, is lower than a temperature predetermined for said counted elapsed time.

6. The fail-safe control method of claim 5 further comprising preventing operation of said lock-up clutch and shifting to maximum gear ratio upon determination of said failure state.

7. The fail-safe control method of claim 5 further comprising sounding an alarm to notify a driver of determination of said failure state.

* * * * *